United States Patent
Wigren et al.

(10) Patent No.: US 8,666,430 B2
(45) Date of Patent: Mar. 4, 2014

(54) METHOD OF IMPROVED POSITIONING

(75) Inventors: Karl Torbjörn Wigren, Uppsala (SE); Liang Shi, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 327 days.

(21) Appl. No.: 13/265,011

(22) PCT Filed: Apr. 20, 2009

(86) PCT No.: PCT/SE2009/050402
§ 371 (c)(1),
(2), (4) Date: Oct. 18, 2011

(87) PCT Pub. No.: WO2010/123418
PCT Pub. Date: Oct. 28, 2010

(65) Prior Publication Data
US 2012/0040693 A1    Feb. 16, 2012

(51) Int. Cl.
*H04W 24/00* (2009.01)
(52) U.S. Cl.
USPC ............... 455/456.1; 455/433; 455/404.2
(58) Field of Classification Search
USPC ................. 455/456.1, 433, 404.2
See application file for complete search history.

(56) References Cited

U.S. PATENT DOCUMENTS

2002/0151313 A1*  10/2002  Stead ...................... 455/456
2010/0062790 A1*  3/2010  Wigren .................. 455/456.1

FOREIGN PATENT DOCUMENTS

| WO | 2007/043915 A1 | 4/2007 | |
| WO | 2007/086784 A1 | 8/2007 | |
| WO | 2007/089182 A1 | 8/2007 | |
| WO | WO2007086784 * | 8/2007 | ............ H04Q 7/38 |
| WO | 2008/069712 A1 | 6/2008 | |
| WO | 2008/127161 A1 | 10/2008 | |

OTHER PUBLICATIONS

3rd Generation Partnership Project. 3GPP TS 23.032, V8.0.0 (Dec. 2008). 3rd Generation Partnership Project; Technical Specification Group Services and System Aspects; Universal Geographical Area Description (GAD) (Release 8). Dec. 2008.
Kangas, A. et al. "Location Coverage and Sensitivity with A-GPS." URSI EMTS 2004. Available online at: www.ee.bgu.ac.il/~specmeth/EMT04/pdf/session_2/2_07_04.pdf.
Zhou, W. et al. "Cluster Merging Algorithm with Link Optimization for Wireless Sensor Networks." International Conference on Wireless Communications, Network and Mobile Computing, 2006 (WiCOM 2006), Wuhan, China, Sep. 22-24, 2006.

* cited by examiner

*Primary Examiner* — Manpreet Matharu
(74) *Attorney, Agent, or Firm* — Coats and Bennett PLLC

(57) ABSTRACT

In a method of improved clustering for providing position determination assisting data in a cellular communication system, providing (S10) a plurality of clusters of points, said points being results of high-precision reference measurements, said points of each of said cluster having the same unique radio fingerprinting tag, identifying (S20) a target cluster, said target cluster having a number of points less than a predetermined threshold. Finally, merging (S30) said target cluster with at least one adjacent cluster of said provided plurality of clusters to provide a merged cluster with an increased number of high-precision reference measurements.

11 Claims, 7 Drawing Sheets

METHOD OF IMPROVED POSITIONING

TECHNICAL FIELD

The present invention relates to telecommunication systems in general, specifically to improved positioning in such systems.

BACKGROUND

In the present disclosure, the term high precision positioning is used to denote positioning methods that have a potential to meet the North-American E-911 emergency positioning requirements. Methods that meet these requirements are capable of obtaining positioning accuracies of
either (terminal based) 50 meters (67%) and 150 m (95%), or (network based) 100 meters (67%) and 300 m (95%).

One well-known positioning method is the so-called Assisted GPS (A-GPS) positioning method. A-GPS is an enhancement of the global positioning system (GPS). An example of an A-GPS positioning system is displayed in FIG. 1, in this case a WCDMA system. In this system, the radio network controller (RNC) acts as the node that collects, refines and distributes assistance data to the terminals (denoted user equipment (UE) in WCDMA). The core network (CN) requests positioning of a UE over the RANAP interface. In response, the RNC may use various kinds of A-GPS techniques, all these techniques do however build on assistance data being handled by a node in the cellular communication system. The RNC orders positioning measurements to be performed in the UE, measurements that are performed by dedicated A-GPS receiver hardware in the terminals. These receivers detect GPS transmissions from the satellites that are also denoted space vehicles (SVs).

Accordingly, the GPS reference receivers attached to e.g. a cellular communication system collect assistance data that, when transmitted to GPS receivers in terminals connected to the cellular communication system, enhance the performance [8] of the GPS terminal receivers. Typically, A-GPS accuracy can become as good as 10 meters also without differential operation. The accuracy becomes worse in dense urban areas and indoors, where the sensitivity is often not high enough for detection of the very weak signals from the GPS satellites.

Additional assistance data is collected from the cellular communication system directly, typically to obtain a rough initial estimate of the position of the terminal together with a corresponding uncertainty of the initial estimate. This position is often given by a cell identity (cell-ID) positioning step, i.e. the position of the terminal is determined with cell granularity. Alternatively, a more accurate position can be obtained by round trip time (RTT) positioning and/or soft(er) handover maps. The GPS time is also estimated with as good accuracy as the cellular system allows.

A recent development that exploits A-GPS is so-called Adaptive Enhanced Cell Identity (AECID) positioning [1]-[6]. A block diagram of an example of a basic implementation of the AECID positioning method is illustrated in FIG. 2.

The AECID positioning algorithm is based on a polygon format and an algorithm for computation of a polygon [7] from a cluster of tagged high-precision position measurements. In WCDMA the high precision measurements are e.g. being provided by A-GPS positioning steps. The main steps of the AECID algorithm are according to the schematic flow below (for WCDMA in particular steps 1a-1c, and steps 5ai-5aiii are important)
1. Tagging of high precision position measurements (e.g. A-GPS measurements) with at least one of
   a. Cell Ids of detected cells.
   b. Auxiliary connection information (e.g. RAB, time)
   c. Quantized auxiliary measurements (e.g. pathloss, signal strength, RTT, pre-coding indices (in multi-input-multi-output (MIMO) configurations these carry angular information) or noise rise)
2. Collection of all high precision measurements with the same tag in high precision measurement clusters.
3. Calculation of a (tagged) polygon that contains a pre-specified fraction of said clustered high precision position measurements in the interior, thereby providing a polygon with known confidence [7] value. Note: The confidence is the probability that the UE is actually located in the reported region.
4. Storage of said tagged polygons in a database of polygons.
5. When an AECID positioning is to be performed, the following steps are performed:
   a. Determination of at least one of
      i. Cell Ids of detected cells.
      ii. Auxiliary connection information
      iii. Quantized auxiliary measurements
   b. Formation of the tag, defined by step a.
   c. Retrieval of the polygon, corresponding to said tag.
   d. Reporting of said polygon, over RANAP or PCAP.

In order to provide reliable positioning according to the above described AECID method e.g. accuracy of the calculated polygons, it is necessary to gather a sufficient number of high-precision measurements in each cluster or for each tag. An insufficient number of measurements may result in a failed positioning or a low accuracy positioning. This leads to an increased waiting time before accurate positioning can be performed. Therefore, there is a need for a method of reducing the waiting time and provide accurate positioning when the number of high-precision measurements is below a certain threshold.

SUMMARY

The present invention relates to improved positioning of mobile terminals in a telecommunication system.

Basically, in a method of improved clustering for providing position determination assisting data in a cellular communication system, providing S10 a plurality of clusters of points, said points being results of high-precision reference measurements, said points of each of said cluster having the same unique radio fingerprinting tag, identifying S20 a target cluster, said target cluster having a number of points less than a predetermined threshold. Finally, merging S30 said target cluster with at least one adjacent cluster of said provided plurality of clusters to provide a merged cluster with an increased number of high-precision reference measurements.

The advantages of the present invention include:
A reduced collection time of high precision measurements/ increased adaptation rate of tagged polygons, of the AECID positioning method. This follows since more points are made available for computation of a polygon for a specific tag at an earlier time. The reason is that polygon computation becomes feasible when said cluster reaches a minimum number of high precision reference measurements.
An enhanced accuracy of the computed polygons of a specific tag, for situations where the terminal is located far from the base station.

BRIEF DESCRIPTION OF THE DRAWINGS

The invention, together with further objects and advantages thereof, may best be understood by referring to the following description taken together with the accompanying drawings, in which.

ABBREVIATIONS

Figure 1:
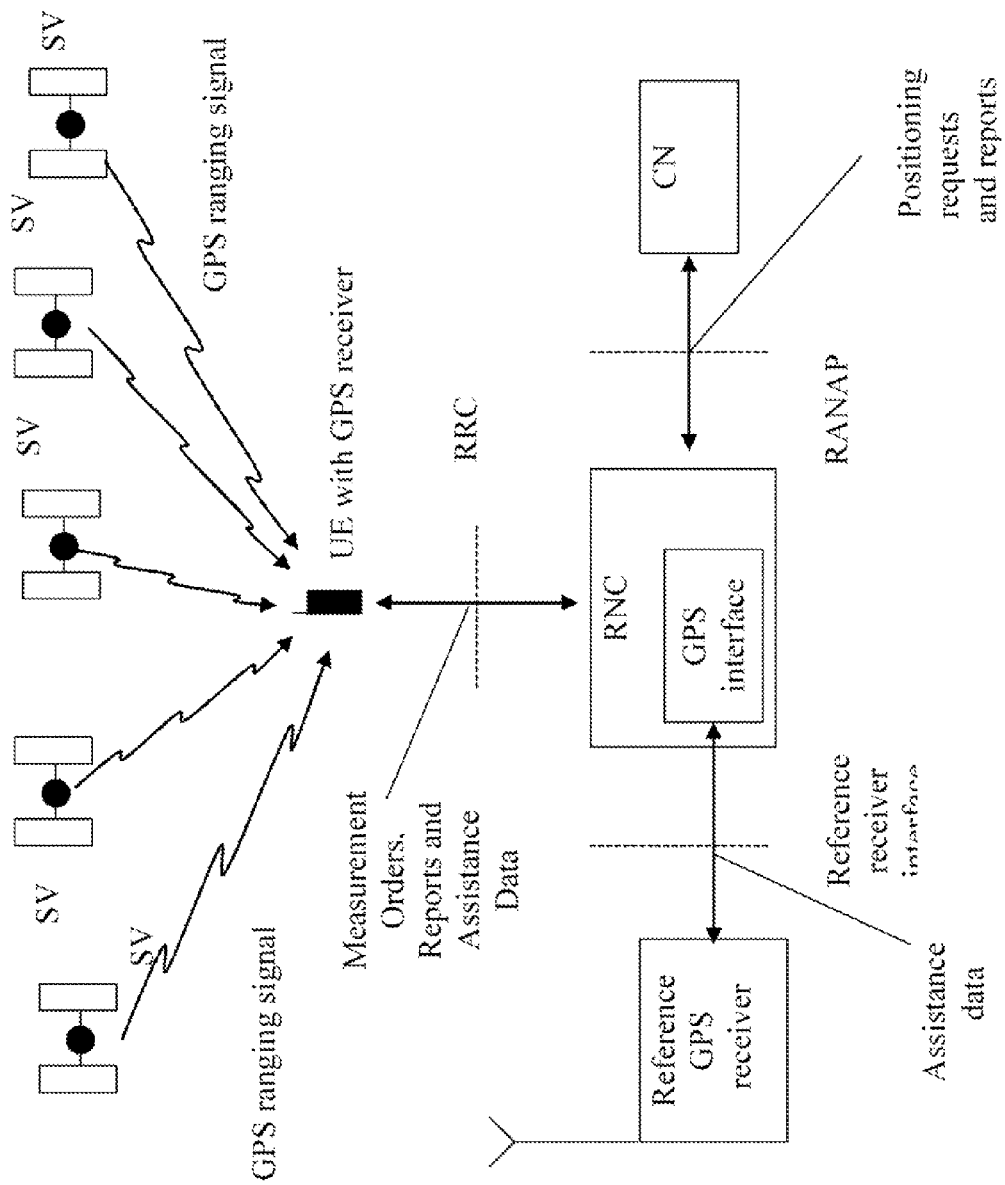
FIG. 1 is an example of a known A-GPS system.
Figure 2:
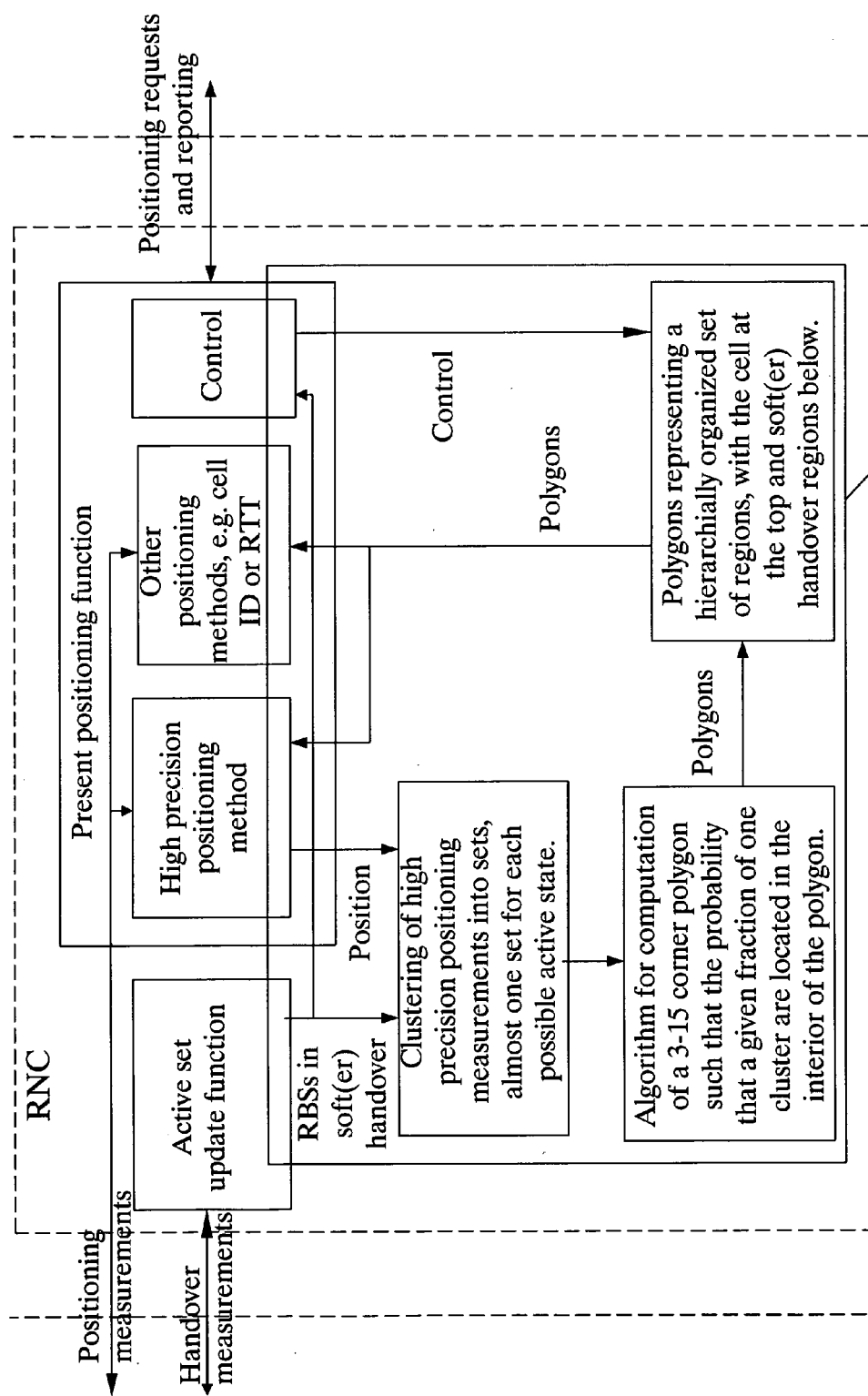
FIG. 2 is an example of a positioning method in which the present invention can be implemented.

AECID Adaptive Enhanced Cell IDentity
A-GPS Assisted GPS
LTE Long Term Evolution
RTT Round Trip Time
TA Timing Advance

DETAILED DESCRIPTION

The present invention concerns positioning of mobile terminals in a telecommunication system, in particular LTE, WCDMA and/or GSM. To enable further understanding of the surrounding problems and functionalities of present day systems, a more detailed description of known methods is provided below.

In order to describe the previously disclosed tagging principles of the AECID algorithm, a known system (for GSM) is described.

When applied in the GSM system the tag consists of

Cell Global Identities (CGIs) of the serving and neighbor cells.

Timing advance (TA) of the serving cell.

Received Signal Strength (RSS) from the serving and neighbor cells. This measurement is quantized.

When applied in the LTE system, the observed time difference of arrival method can augment A-GPS in the generation of high precision reference measurements. The tag of the LTE system may utilize:

Cell IDs of the serving and other cell.

Timing Advance (TA) of the serving cell.

Signal strengths of the serving and other cells.

Pre-coding indices of the serving cell (this information carries angular information).

In e.g. WCDMA other quantities would be used, e.g. cell ID, round trip time (RTT), cell IDs of the active set, and path loss with regard to detected base stations. In GSM, the range of TA value is from 0 to 63. One TA arc is around 1,110 meters thick. The adjacent TA arcs overlap with each other.

There can be up to six neighbor cells reported in GSM. If all these neighbor cells are included in the TAG, a better accuracy can be achieved, but more high precision reference measurements are needed. As a compromise, the cells with stronger signal strength may be selected. The maximum neighbor cell number may also be configurable. For example, if the number is three, up to three cells with strongest signal strength are included in the TAG during polygon computation and also AECID positioning.

The range of the signal strength in GSM is from 0 to 63. For use in AECID it is quantized into less values. The quantization scheme can be described as in the table below:

| Signal Strength | Quantized Value |
|---|---|
| Low0-High0 | 0 |
| Low1-High1 | 1 |
| Low2-High2 | 2 |
| ... | ... |
| Lown-Highn | N |

Early during measurement collection for AECID few measurements are available, so it is reasonable to quantize signal strength into only two values. The table below gives an example of a quantization scheme:

| Signal Strength | Quantized Value |
|---|---|
| 0-40 | 0 |
| 41-63 | 1 |

The tags and tagged AECID polygons are organized in a hierarchy. For each layer of the hierarchy, AECID polygons are computed if there are enough high precision reference measurements. This means that in case there are not enough high precision (A-GPS) reference measurements, the algorithm proceeds at the next higher level. For GSM control plane, the TAG of each layer is:

| Layer | TAG |
|---|---|
| 1 | CGI |
| 2 | CGI + TA |
| 3 | CGI + TA + Neighbor Cell List |
| 4 | CGI + TA + Neighbor Cell List + Signal Strength |

Figure 3:
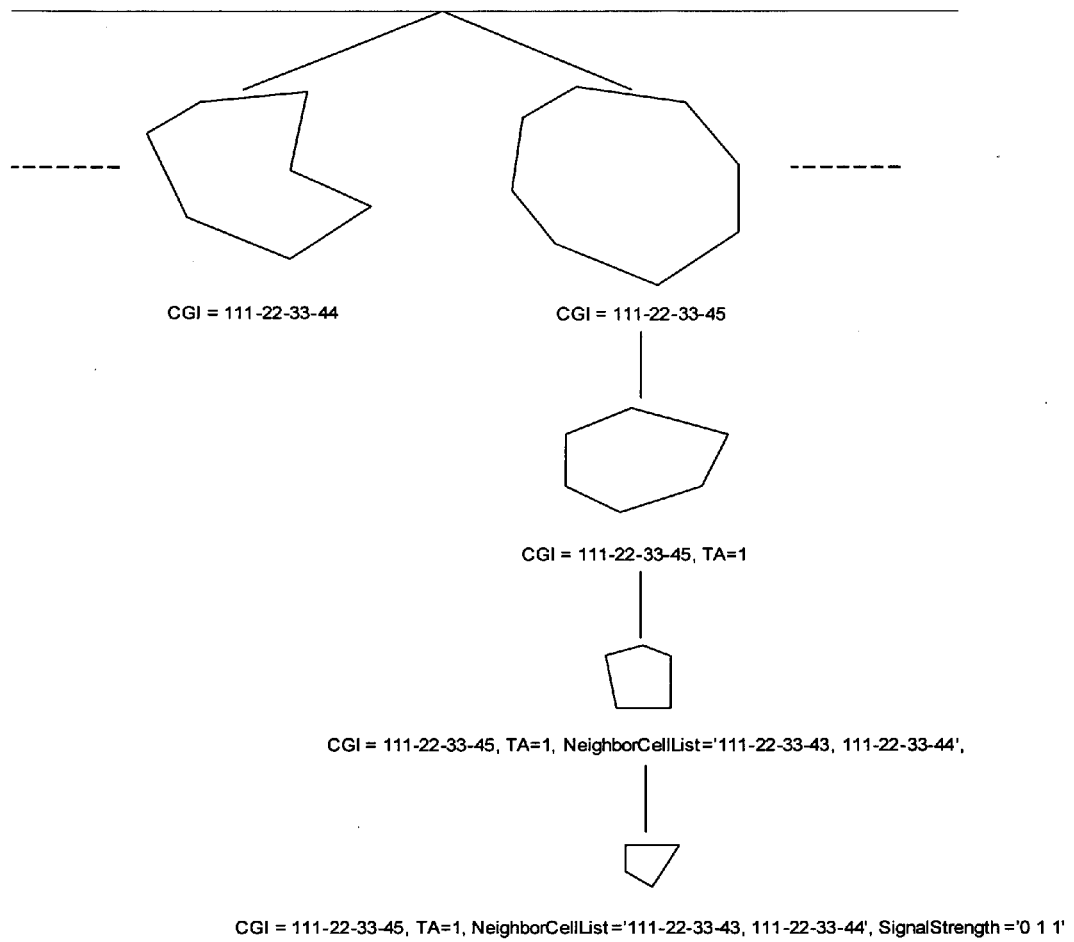
FIG. 3 illustrates the principles of tagging.

The above described tagging system only serves as an example, other manners of systematizing tags for measurements are equally viable in the context of the present disclosure. A graphic illustration of the GSM tagging hierarchy is illustrated in FIG. 3.

A first main problem addressed by the present disclosure is that the number of high precision (A-GPS) reference or positioning measurements (latitude, longitude points) in each tagged geographical cluster (see [1]-[6]) may not be sufficient for calculation of the polygon that is used in order to describe the extension of each of the fingerprinted geographical regions of the cellular network. The present invention solves this by providing a method of increasing the number of high-precision measurements of clusters by merging adjacent clusters at the same tag hierarchy level.

Figure 4:
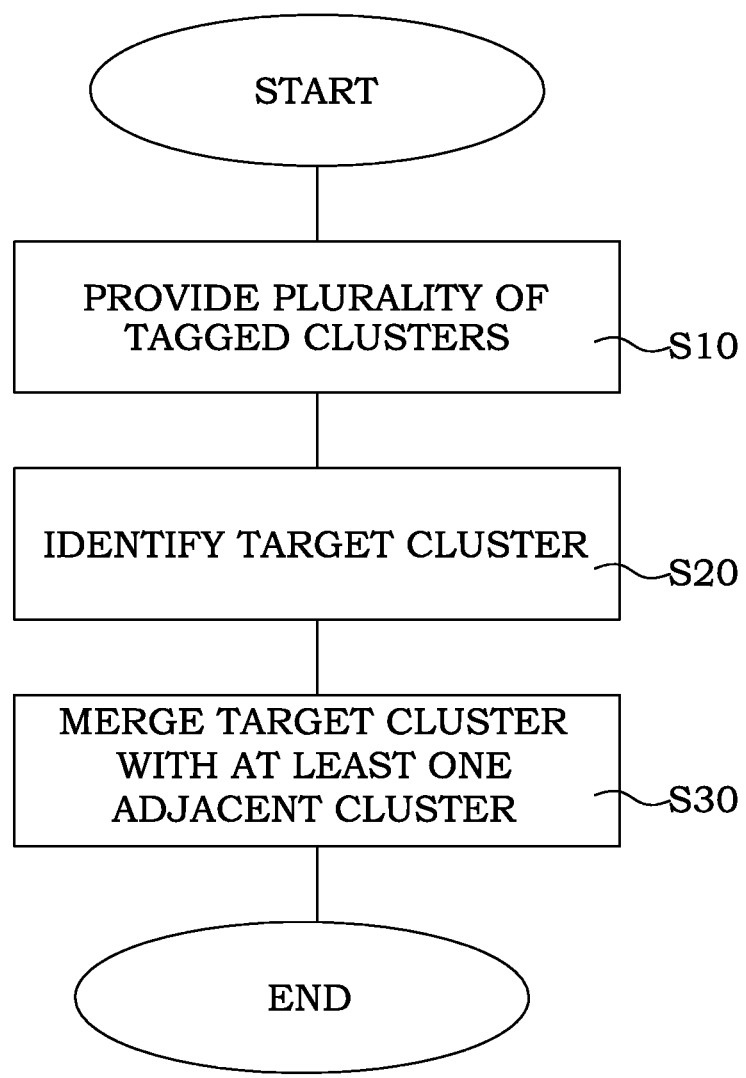
FIG. 4 illustrates an embodiment of a method according to the present invention.

With reference to FIG. 4, a basic embodiment of a method for improved clustering for providing position determination assisting data in a cellular communication system includes the following basic steps. Initially, providing S10 a plurality of clusters of points, said points being results of high-precision reference measurements, said points of each of said cluster having the same unique radio fingerprinting tag. The collection of the high-precision measurements are not described in detail, but are well known in the field of the invention. Typically A-GPS or OTDOA high precision measurements of opportunity are used, where OTDA measurement in LTE are used to support AECID positioning indoors. Subsequently, identifying S20 a target cluster, said target cluster having a number of points less than a predetermined threshold. In other words, at a certain point in time the number of high-precision measurements of a specific cluster has not reached a predetermined number, thus potentially leading to a low accuracy polygon calculation. Finally, merging S30 or combining the target cluster with at least one adjacent cluster of said provided plurality of clusters to provide a merged cluster with an increased number of high-precision reference measurements, which in turn enables calculation of a tagged polygon with improved accuracy.

Consequently, the disclosed invention enables increasing the number of high precision reference position measurements of each tagged cluster that is used for calculation of the polygon that describes the extension of the tagged cluster geographically. The increase can, according to embodiments of the present invention, be achieved in at least two different ways:

a. By removal of components of the tag when components represent radio properties that overlap geographically, [problem due to: said overlap making the division of high precision measurements into clusters more fine, said clusters then containing less high precision measurements]; said removal serving to make the division of high precision into clusters more coarse, thereby increasing the number of high precision (A-GPS) reference measurements in said clusters; said removal being applied in the computation of the polygon which describes the geographical extension of the tagged cluster.

b. By using unions of tags that do not fully overlap geographically.

A further problem addressed by the present disclosure is due to the fact that timing advance (TA) measurements in GSM and LTE and round trip time (RTT) [6] measurements in WCDMA that are used for tagging tend to generate curved regions that are very wide laterally and narrow in a radial direction (with respect to the base station). Since there are typically only a maximum number of 15 polygon corner points [7] that can be used in the calculation of the polygon describing such clusters, the result is a loss of accuracy and a reduced applicability of the AECID fingerprinting positioning algorithm. The problem is hence the ratio of the lateral width and the radial 10 thickness of such arcs cannot be allowed to become too large in order to avoid the polygon computation problem. The present invention mitigates the problem by using a union of tags so that adjacent clusters, as counted by RTT and TA tag components, are merged in the calculation of the polygon that describes the geographical extension of said clusters. Consequently, the use of unions of tags result in a merged cluster with reduced narrowness in the radial direction i.e. increased geographical extension.

A problem with the above solutions may seem to be the need to introduce information in the cluster databases indicating that the clusters have been merged. Only then, it seems possible to go back to un-merged clusters when a sufficient number of high precision (A-GPS) reference measurements have been collected. An alternative would be to create temporary clusters for polygon computation, by retaining only the original clusters in the database of tagged clusters, and by retaining the original tag for each cluster when the tag is transformed to the polygon; said polygon yet being computed from a temporary cluster, being obtained by merging according to any of the principles described above.

A final problem that needs to be addressed is that of deciding on which tags and underlying regions that are to be merged. This problem is clearly not trivial since it depends on the enumeration of cells and base stations.

In summary, the problems addressed with the present invention are all associated with the fact that the presently known functionality for fingerprinting positioning is lacking functionality for the situation where there are too few high-precision measurement points for a cluster or tagged cluster. The problems include 1. The number of high precision (A-GPS) reference measurements required for the AECID polygon computation from a tagged cluster of high precision (A-GPS) reference measurements, may not be sufficient; said insufficient number of measurements leading to either a failed positioning, or a positioning with a significantly reduced accuracy at the next higher tag hierarchy level.
2. The waiting time before a sufficient number of high precision (A-GPS) measurements have been collected, at a given tag hierarch level, may be quite large; said waiting time only being less at the next higher tag hierarchy level, with an associated accuracy that is significantly worse than that at the original tag hierarch level.
3. The ratio between the lateral width and the radial thickness of clusters that occur when timing advance (TA) and round trip time (RTT) measurements are used for fingerprinting with the AECID method become very large far away from the base station, a fact that deteriorates the accuracy of the polygon computed by the contracting polygon algorithm, of the AECID positioning method [1]-[6].

In addition, embodiments of the present invention enables using unions of tags so that adjacent clusters, as counted by RTT and TA tag components, are merged in the calculation of the polygon that describes the geographical extension of said clusters; said use of unions of tags resulting in a cluster with reduced narrowness in the radial direction, e.g. an increased geographical extension.

Finally, enabling the above-described embodiments without modifying or altering said collected clusters of high precision reference measurements; said techniques retain the original tag also after tag merging has been applied.

Figure 5:
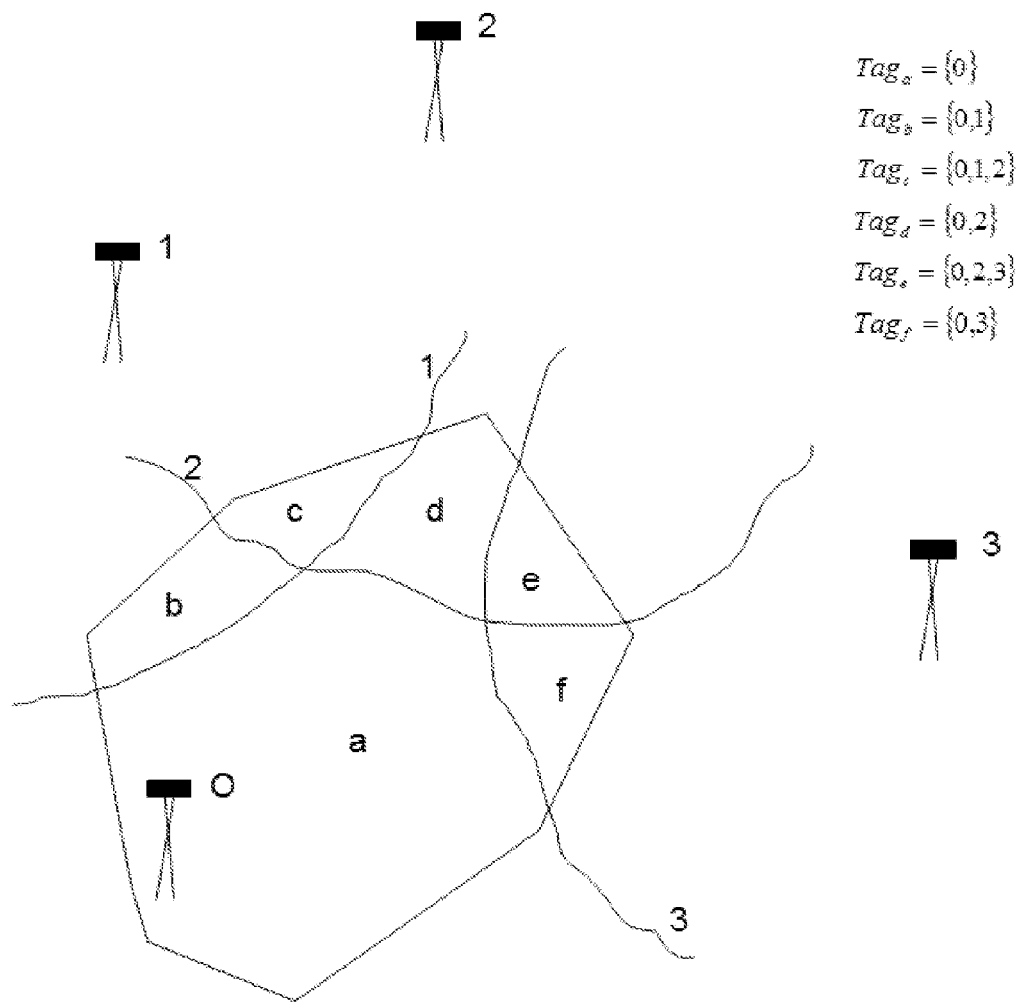
FIG. 5 illustrates an example of a system in which the invention can be implemented.

With reference to FIG. 5, the various embodiments of tag merging of the present invention will be described in the context of an example for GSM. In the example telecommunication system four base stations BS0, BS1, BS2, BS3 transmit radio signals that (for tag merging description purposes) are analyzed in the cell of base station BS0. That cell is depicted by its cell polygon. The tag at CGI level would hence correspond to that cell. FIG. 5 also displays boundaries between high and low signal strength for each of the base stations BS1, BS2 and BS3. As seen in FIG. 5, these boundaries generate the regions a-f with different tags, the tag components 1,2 and 3 indicate regions where the corresponding signal strength component of the tag is high, i.e. the components corresponds to the originating base station.

According to a first embodiment of a method of tag merging according to the present invention, consider a situation where the number of high precision (A-GPS) reference measurements of a region c is too small for computation of a polygon, describing said region. In other words, the number of high precision reference measurements of region c fails to reach a predetermined threshold number, thus making the measurements of region c into a cluster targeted for tag merging. In that case $Tag_c$ is compressed by removal of the third component, i.e.

$$Tag_c := \{0,1\}.$$

Note that the database of tagged clusters is not modified—the tagging is only changed during extraction from the database of said clusters for polygon computation. By removal of the third component, the components of the $Tag_c$ now coincide with the components of $Tag_b$. Consequently, the effect of the tag change is that the cluster points of previous $Tag_c$ are merged with the cluster points of $Tag_b$. Taken together the number of points of the so merged cluster is here assumed to be high enough for computation of a polygon describing b∪c, i.e. the union of the regions b and c. This region is larger than c, hence the accuracy is reduced. This is however a consequence of the fact that the number of high precision reference measurements is simply not enough for generation of the region c. Note that when storing the computed polygon in the database, the original tag $Tag_c$ is used to tag the calculated polygon.

According to a second embodiment, also with reference to the example of FIG. 5, the merging of adjacent clusters can be provided by using unions of tags—this is useful when combining more than one region. Consider e.g. the situation where it has been decided to merge regions b, c, and d, in order to have a sufficient amount of high precision reference measurements in the polygon tagged with $Tag_c$. In this situation, the tag needs to be denoted as $$Tag_c = \{0,1\} \cup \{0,1,2\} \cup \{0,2\}$$

when computing the polygon.

Figure 6:
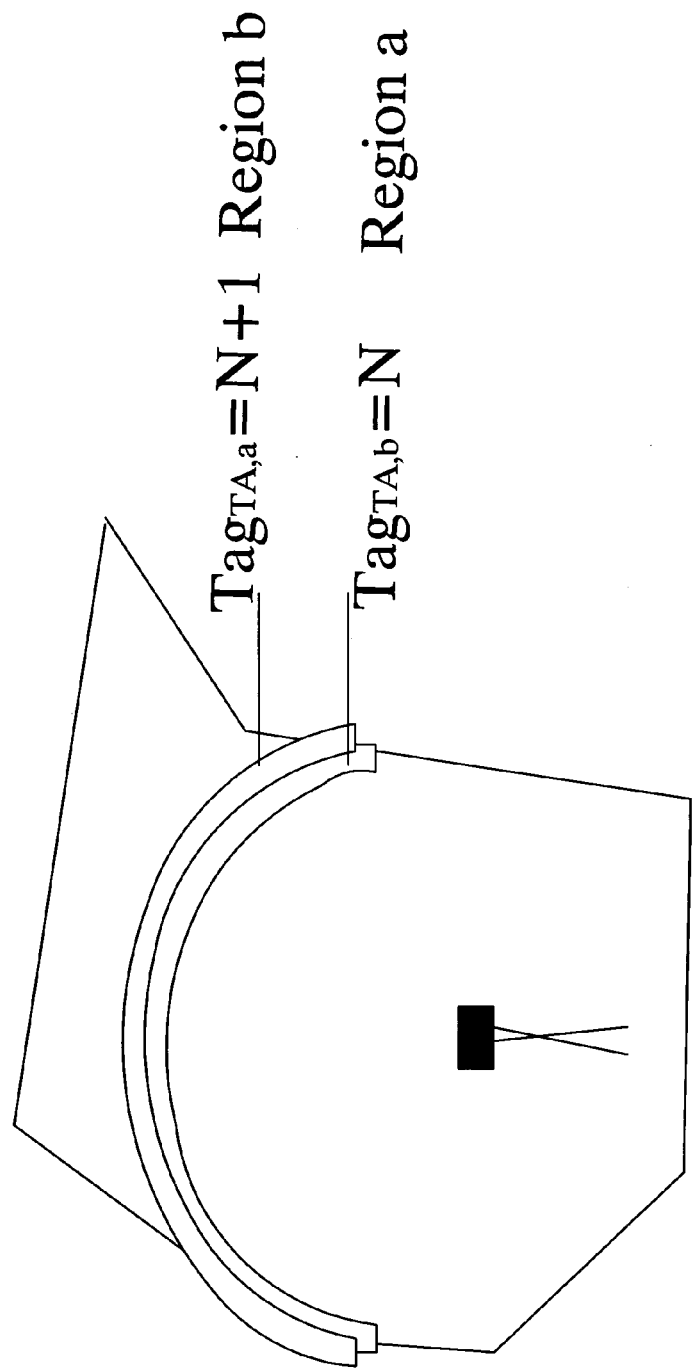
FIG. 6 illustrates a further example of the present invention.

For the particular case of tag merging or cluster merging of TA or RTT a very simple example, in the context of GSM, where merging of adjacent timing advance tags is performed, is depicted in FIG. 6. Similar merging can be applied in a WCDMA system. Although the figure concerns TA measurements, it is equally applicable to RTT measurements.

According to an embodiment for tag merging, the union of the tag $Tag_{TA,a}$ and $Tag_{TA,b}$ is used to reduce the ratio between width and thickness of region a. Hence, when computing the polygon for region a, the tag $$Tag_{TA,a} = \{N\} \cup \{N+1\}$$

is used. A similar procedure is used for all TA regions far away enough from the base station. Further out from the base station, more than 2 tags may be merged. In this context, an adjacent tag or cluster is adjacent in a radial direction with relation to the originating base station.

In order to further enhance the effect of the above-described embodiments, it is preferable that an efficient method of selecting which tagged clusters to merge is provided.

For tags at the highest hierarchical level, the merging needs to be performed with tags that correspond to the cells that are closest geographically to the cell of the tag that is subject to tag merging, i.e. the target cluster or target tag. In practice this can be obtained by
- (Pre-)ordering of the cell IDs, according to their geographical closeness.
- (Pre)-computation of the center of gravities of the clusters, of all clusters corresponding to the top tag hierarchical level, followed by a search for the cell and tag that are closest to the cell subject to tag merging.

For tags at lower hierarchical levels, a simple approach is to search for tags that are identical at higher levels—then search for the best candidates for merging. Also this search can be based on the principles for the highest level, i.e.
- Ordering of the clusters, according to their geographical closeness.
- (Pre)-computation of the center of gravities of the clusters, of all clusters corresponding to the top tag hierarchical level, followed by a search for the cell and tag that are closest to the cluster subject to tag merging.

It is stressed that these are only examples, it will be obvious for anyone skilled in the art to generalize these concepts.

In summary, an improved AECID positioning algorithm with tag merging according to the present invention could be formulated as follows, using WCDMA for the example.
1. Tagging of high precision position measurements with at least one of
   a. Cell Ids of detected cells.
   b. Auxiliary connection information (e.g. RAB, time)
   c. Quantized auxiliary measurements (e.g. pathloss, signal strength, RTT or noise rise)
2. Collection of all high precision measurements with the same tag in high precision measurement clusters.
3. Tag merging according to the present invention.
4. Calculation of a (tagged) polygon, that contains a pre-specified fraction of said clustered high precision position measurements in the interior, thereby providing a polygon with known confidence [7] value. Note: The confidence is the probability that the UE is actually located in the reported region.
5. Storage of said tagged polygons in a database of polygons.
6. When an AECID positioning is to be performed, the following steps are performed:
   a. Determination of at least one of
      1. Cell Ids of detected cells.
      2. Auxiliary connection information (e.g. RAB, time)
      3. Quantized auxiliary measurements (e.g. path loss, signal strength, RTT or noise rise)
   b. Formation of the tag, defined by step a.
   c. Retrieval of the polygon, corresponding to said tag.
   d. Reporting of said polygon, over RANAP or PCAP.

Figure 7:
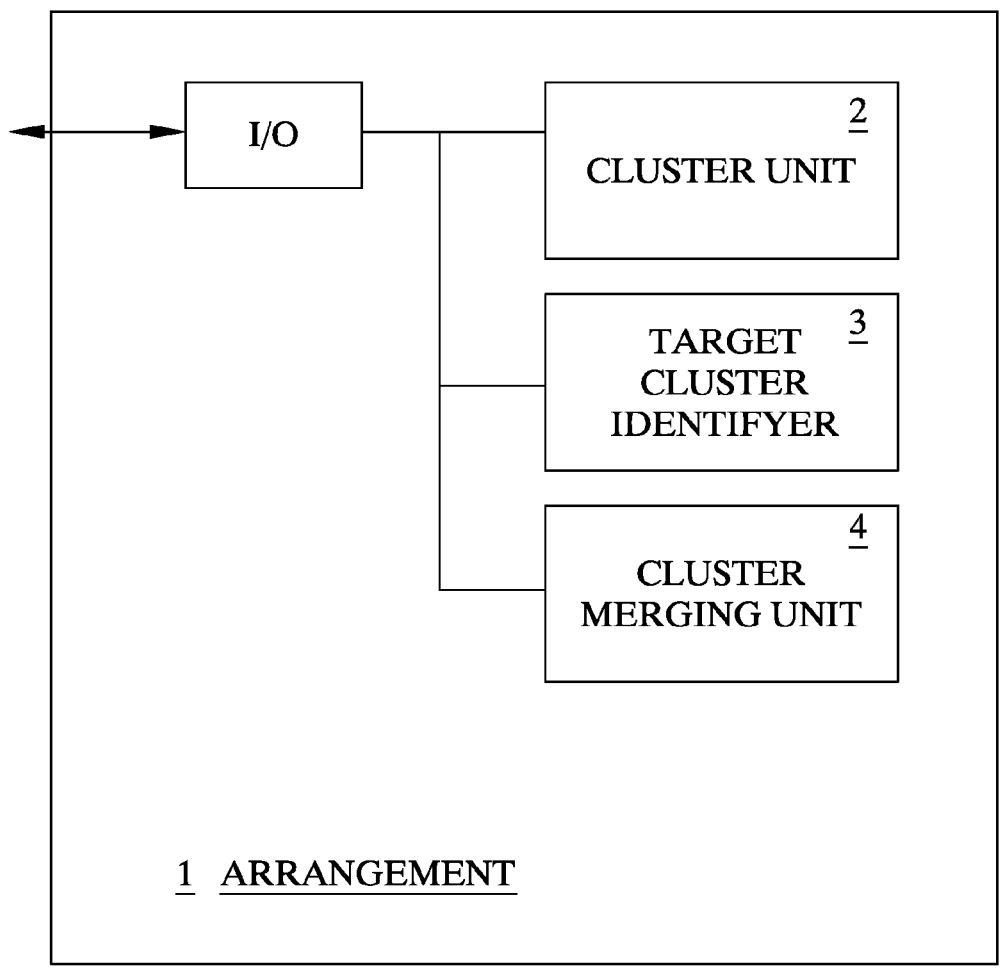
FIG. 7 illustrates an embodiment of an arrangement according to the present invention.

With reference to FIG. 7 an arrangement configured to perform the method according to the invention will be described. It is evident that the arrangement can be implemented as an actual hardware device, or as a software device with functionalities spread amongst a plurality of hardware devices. For simplicity reasons the device is described as one physical entity, but it can equally well be divided into sub devices that are located at different nodes in the system. A potential location of the arrangement is as part of a Radio network controller in the system, or in some other node involved in positioning of mobile terminals.

According to a basic embodiment with reference to FIG. 7, an arrangement 1 for improved clustering for providing position determination assisting data in a cellular communication system includes the following entities or units or functions. The arrangement 1 includes a clustering unit 2 for providing a plurality of clusters of points that are results of high-precision reference measurements. Each point of each cluster has a same unique radio fingerprinting tag. In addition, the arrangement includes an identifying unit 3 configured for identifying a target cluster that has number of points less than a predetermined threshold. In other words, the identifier 3 locates clusters that potentially include too few points to enable a meaningful polygon to be calculated. Finally, the arrangement 1 includes a combiner or merging unit 4 for merging the identified target cluster with at least one selected adjacent cluster of the provided plurality of clusters to provide a merged cluster with an increased number of high-precision reference measurements.

The advantages of the invention include
1. A reduced collection time of high precision measurements/increased adaptation rate of tagged polygons, of the AECID positioning method. This follows since more points are made available for computation of a polygon for a specific tag after a given period of time.
2. An enhanced accuracy of the computed polygons of a specific tag, for situations where the terminal is located far from the base station, and when RTT and TA tagging is exploited.
3. The fact that the use of the AECID fingerprinting algorithm is unaffected, both with respect to collection and clustering of high precision measurements, tagging structure, position determination using the database, and reporting. It is only the computation of the tagged polygon that are affected by the temporary merging of tags.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] T. Wigren, "Adaptive enhanced cell identity positioning", PCT/SE2005/001485, Oct. 7, 2005.
[2] T. Wigren, "Path loss polygon positioning", PCT/SE2006/000132, Jan. 30, 2006.
[3] T. Wigren, "Method and arrangement in a telecommunication system", PCT/SE2006/050068, Apr. 10, 2006.
[4] T. Wigren, "Extended clustering for improved positioning", PCT/SE2006/050440, Oct. 30, 2006.
[5] T. Wigren, "Method and arrangement for enhanced cell identification and cell positioning, PCT/SE2006/050535, Dec. 4, 2006.
[6] T. Wigren, "Adaptive polygon computation and shape conversion for RTT positioning", PCT/SE2007/050189, Mar. 27, 2007.
[7] 3GPP, TS 23.032, "Universal Geographical Area Description (GAD).
[8] A. Kangas and T. Wigren, "Location coverage and sensitivity with A-GPS", URSI EMP-S, Pisa, Italy, May, 200

The invention claimed is:

1. A method of improved clustering for providing position determination assisting data in a cellular communication system, comprising:
providing a plurality of clusters of points, said points resulting from high-precision reference measurements, said points of each of said cluster having the same unique radio fingerprinting tag;
identifying a target cluster, said target cluster having a number of points less than a predetermined threshold; and
merging said target cluster with at least one selected adjacent cluster of said provided plurality of clusters to provide a merged cluster with an increased number of high-precision reference measurements.

2. The method of claim 1, wherein said merging comprises:
removing a component of a tag of said target cluster in order to transform said tag to also include the tag of said at least one adjacent cluster; and
merging said target cluster and said at least one cluster into said merged cluster, said merged cluster being tagged with said transformed tag.

3. The method of claim 1, wherein said merging comprises forming the union of said target cluster and said at least one adjacent cluster to form a merged cluster with an increased geographical extension.

4. The method of claim 1, further comprising selecting said at least one selected adjacent cluster by ordering cell-IDs of said plurality of clusters based on their geographical position.

5. The method of claim 4, further comprising selecting said at least one selected adjacent cluster by calculating center of gravities of all said clusters, and searching for clusters with center of gravities within a predetermined geographical distance from said target cluster.

6. The method of claim 3, wherein said high precision reference measurements comprise timing advance or round trip time measurements, and wherein said merging comprises merging radially adjacent clusters to provide a region with reduced ratio between a width and thickness.

7. The method of claim 1, wherein said high precision reference measurements comprise GSM configuration Assisted Global Positioning System (A-GPS) reference measurements, and said tag comprises one or any subset of Cell Global Identities (CGIs), Timing Advances (TAs) and Received Signal Strengths (RSSs).

8. The method of claim 1, wherein said high precision reference measurements comprise WCDMA configuration Assisted Global Positioning System (A-GPS) reference measurements, and said tag comprises one or any subset of Cell Identities (IDs), Round Trip Times (RTTs), pre-coding indices, and path-losses.

9. The method of claim 1, wherein said high precision reference measurements comprise Round Trip Time (RTT) configuration Assisted Global Positioning System (A-GPS) reference measurements, or Observed Time Difference of Arrival (OTDOA) reference measurements, and wherein said tag comprises one or any subset of Cell Identities (IDs), signal strengths, and pre-coding indices.

10. An arrangement for improved clustering for providing position determination assisting data in a cellular communication system, comprising:
a clustering unit for providing a plurality of clusters of points, said points being results of high-precision reference measurements, said points of each of said cluster having the same unique radio fingerprinting tag;
an identifier for identifying a target cluster, said target cluster having a number of points less than a predetermined threshold; and
a combiner for merging said target cluster with at least one selected adjacent cluster of said provided plurality of clusters to provide a merged cluster with an increased number of high-precision reference measurements.

11. The arrangement of claim 10, wherein the arrangement is included within a node in a telecommunication system.

* * * * *